US012633027B2

(12) United States Patent
Kim et al.

(10) Patent No.: US 12,633,027 B2
(45) Date of Patent: May 19, 2026

(54) SYSTEMS AND METHODS FOR GESTURE GENERATION FROM TEXT

(71) Applicant: Datum Point Labs Inc., Jackson, WY (US)

(72) Inventors: Gwantae Kim, Seoul (KR); Hanseok Ko, Seoul (KR)

(73) Assignee: Datum Point Labs Inc., Jackson, WY (US)

( * ) Notice: Subject to any disclaimer, the term of this patent is extended or adjusted under 35 U.S.C. 154(b) by 113 days.

(21) Appl. No.: 18/626,166

(22) Filed: Apr. 3, 2024

(65) Prior Publication Data

US 2024/0338874 A1     Oct. 10, 2024

Related U.S. Application Data

(60) Provisional application No. 63/457,551, filed on Apr. 6, 2023.

(51) Int. Cl.
| | |
|---|---|
| *G06T 13/40* | (2011.01) |
| *G06F 40/284* | (2020.01) |
| *G06N 3/044* | (2023.01) |
| *G06N 3/045* | (2023.01) |
| *G06N 3/08* | (2023.01) |

(52) U.S. Cl.
CPC ........... *G06T 13/40* (2013.01); *G06F 40/284* (2020.01); *G06N 3/044* (2023.01); *G06N 3/045* (2023.01); *G06N 3/08* (2013.01); *G06T 2200/24* (2013.01)

(58) Field of Classification Search
CPC ......... G06T 13/40; G06F 40/284; G06N 3/08; G06N 3/044; G06N 3/045
See application file for complete search history.

(56) References Cited

U.S. PATENT DOCUMENTS

| | | | | |
|---|---|---|---|---|
| 11,648,480 | B2 * | 5/2023 | Akhoundi ............ | G06N 3/0455 |
| | | | | 706/11 |
| 11,908,180 | B1 * | 2/2024 | Ho .......................... | G06V 10/82 |
| 2019/0304157 | A1 * | 10/2019 | Amer ..................... | G06F 40/216 |
| 2021/0220739 | A1 * | 7/2021 | Zinno ...................... | A63F 13/65 |
| 2021/0248804 | A1 * | 8/2021 | Hussen Abdelaziz .. | G06T 13/80 |

(Continued)

OTHER PUBLICATIONS

Ahn H, Ha T, Choi Y, Yoo H, Oh S. Text2action: Generative adversarial synthesis from language to action. In2018 IEEE International Conference on Robotics and Automation (ICRA) May 21, 2018 (pp. 5915-5920). IEEE. (Year: 2018).*

(Continued)

*Primary Examiner* — King Y Poon
*Assistant Examiner* — Vincent Peren
(74) *Attorney, Agent, or Firm* — Buchalter LLP

(57) ABSTRACT

Embodiments described herein provide systems and methods for gesture generation from text. A method for gesture generation includes receiving an input text. The method may further include generating, via an encoder, an action representation in an action representation space based on the input text. The method may further include generating, via a first motion decoder, a first body configuration based on the action representation. The method may further include generating, via a second motion decoder, a second body configuration based on the first body configuration. The method may further include generating, via a token decoder, a first stop token based on the first body configuration.

13 Claims, 13 Drawing Sheets

(56) References Cited

U.S. PATENT DOCUMENTS

| | | | | |
|---|---|---|---|---|
| 2023/0082830 A1* | 3/2023 | Fan | G06N 3/045 | 704/258 |
| 2023/0135769 A1* | 5/2023 | Bhattacharya | G06N 3/088 | 345/156 |
| 2023/0260182 A1* | 8/2023 | Saito | G06T 17/00 | 345/474 |
| 2023/0290371 A1* | 9/2023 | Jawahar | G10L 21/10 | |
| 2023/0316616 A1* | 10/2023 | Akhoundi | G06N 3/09 | |

OTHER PUBLICATIONS

Ahuja C, Morency LP. Language2pose: Natural language grounded pose forecasting. In2019 International conference on 3D vision (3DV) Sep. 16, 2019 (pp. 719-728). IEEE. (Year: 2019).*

Kucherenko T, Jonell P, Van Waveren S, Henter GE, Alexandersson S, Leite I, Kjellström H. Gesticulator: A framework for semantically-aware speech-driven gesture generation. In Proceedings of the 2020 international conference on multimodal interaction Oct. 21, 2020 (pp. 242-250). (Year: 2020).*

Hong F, Zhang M, Pan L, Cai Z, Yang L, Liu Z. Avatarclip: Zero-shot text-driven generation and animation of 3d avatars. arXiv preprint arXiv:2205.08535. May 17, 2022. (Year: 2022).*

Guo C, Zuo X, Wang S, Cheng L. Tm2t: Stochastic and tokenized modeling for the reciprocal generation of 3d human motions and texts. InEuropean Conference on Computer Vision Oct. 23, 2022 (pp. 580-597). Cham: Springer Nature Switzerland. (Year: 2022).*

Tevet G, Gordon B, Hertz A, Bermano AH, Cohen-Or D. Motionclip: Exposing human motion generation to clip space. In European Conference on Computer Vision Oct. 23, 2022 (pp. 358-374). Cham: Springer Nature Switzerland. (Year: 2022).*

Youngwoo Yoon, Bok Cha, Joo-Haeng Lee, Minsu Jang, Jaeyeon Lee, Jaehong Kim, and Geehyuk Lee, "Speech gesture generation from the trimodal context of text, audio, and speaker identity," ACM Transactions on Graphics (TOG), vol. 39, No. 6, 2020.

Julieta Martinez, Michael J Black, and Javier Romero, "On human motion prediction using recurrent neural networks," in Proceedings of the IEEE conference on computer vision and pattern recognition, 2017, pp. 2891-2900.

Sijie Yan, Zhizhong Li, Yuanjun Xiong, Huahan Yan, and Dahua Lin, "Convolutional sequence generation for skeleton-based action synthesis," in Proceedings of the IEEE/CVF International Conference on Computer Vision, 2019, pp. 4394-4402.

Haoye Cai, Chunyan Bai, Yu-Wing Tai, and Chi-Keung Tang, "Deep video generation, prediction and completion of human action sequences," in Proceedings of the European conference on computer vision (ECCV), 2018.

Ping Yu, Yang Zhao, Chunyuan Li, Junsong Yuan, and Changyou Chen, "Structure-aware human-action generation," in European Conference on Computer Vision. Springer, 2020.

Chuan Guo, Xinxin Zuo, SenWang, Shihao Zou, Qingyao Sun, Annan Deng, Minglun Gong, and Li Cheng, "Action2motion: Conditioned generation of 3d human motions," in Proceedings of the 28th ACM International Conference on Multimedia, 2020.

* cited by examiner

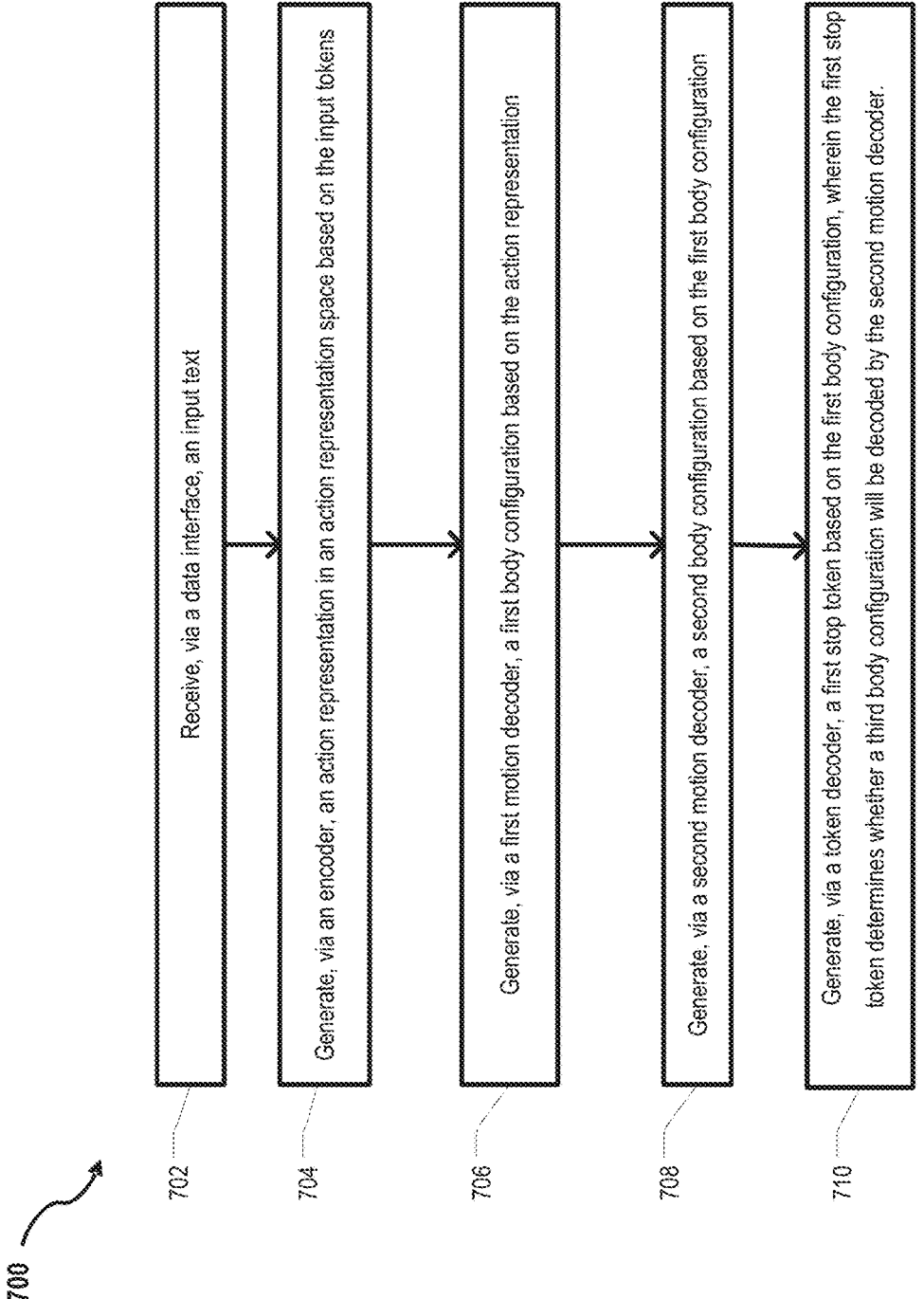

702 Receive, via a data interface, an input text

704 Generate, via an encoder, an action representation in an action representation space based on the input tokens 706 Generate, via a first motion decoder, a first body configuration based on the action representation 708 Generate, via a second motion decoder, a second body configuration based on the first body configuration 710 Generate, via a token decoder, a first stop token based on the first body configuration, wherein the first stop token determines whether a third body configuration will be decoded by the second motion decoder.

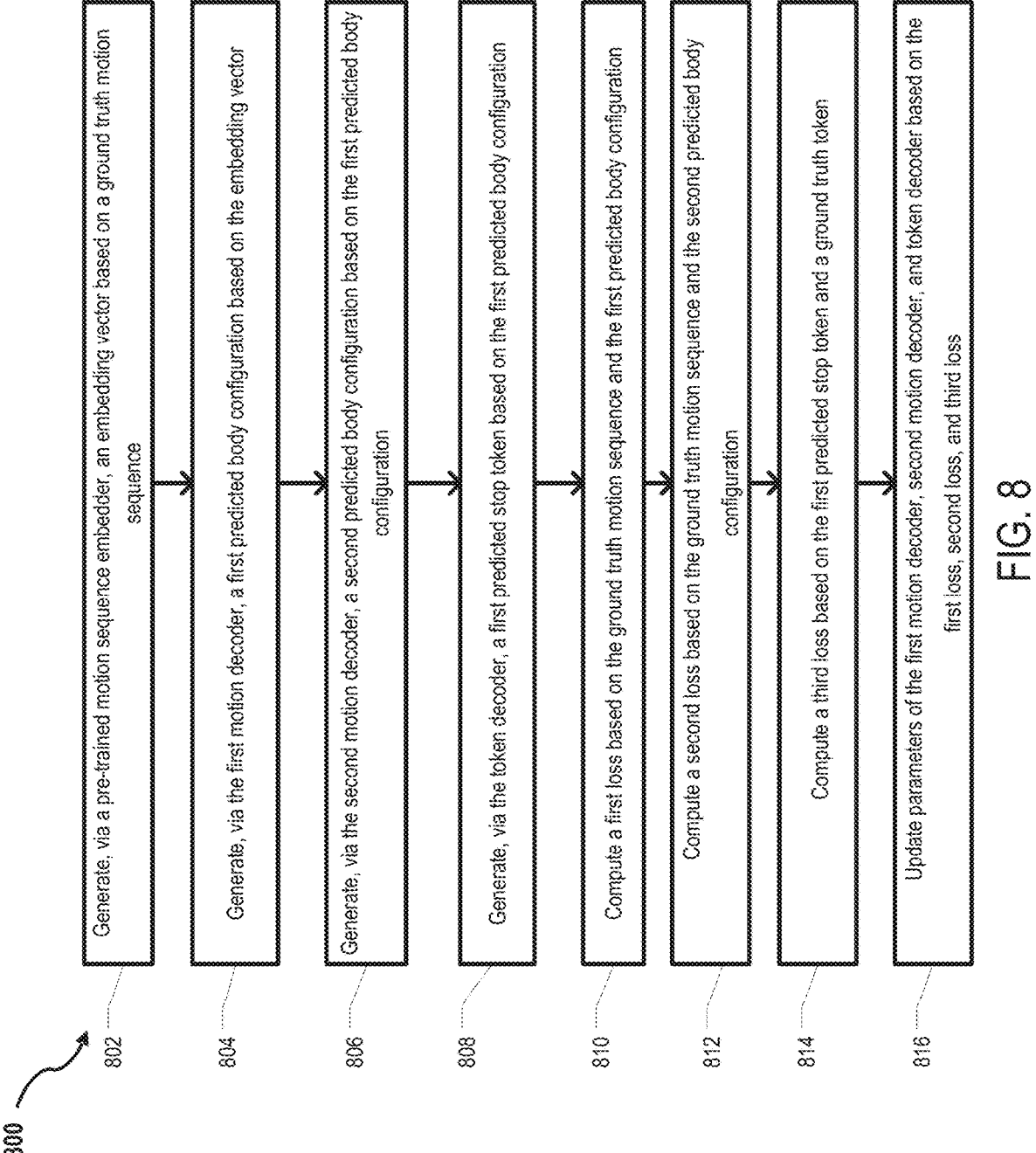

Generate, via a pre-trained motion sequence embedder, an embedding vector based on a ground truth motion sequence Generate, via the first motion decoder, a first predicted body configuration based on the embedding vector Generate, via the second motion decoder, a second predicted body configuration based on the first predicted body configuration Generate, via the token decoder, a first predicted stop token based on the first predicted body configuration Compute a first loss based on the ground truth motion sequence and the first predicted body configuration Compute a second loss based on the ground truth motion sequence and the second predicted body configuration Compute a third loss based on the first predicted stop token and a ground truth token Update parameters of the first motion decoder, second motion decoder, and token decoder based on the first loss, second loss, and third loss

FIG. 8

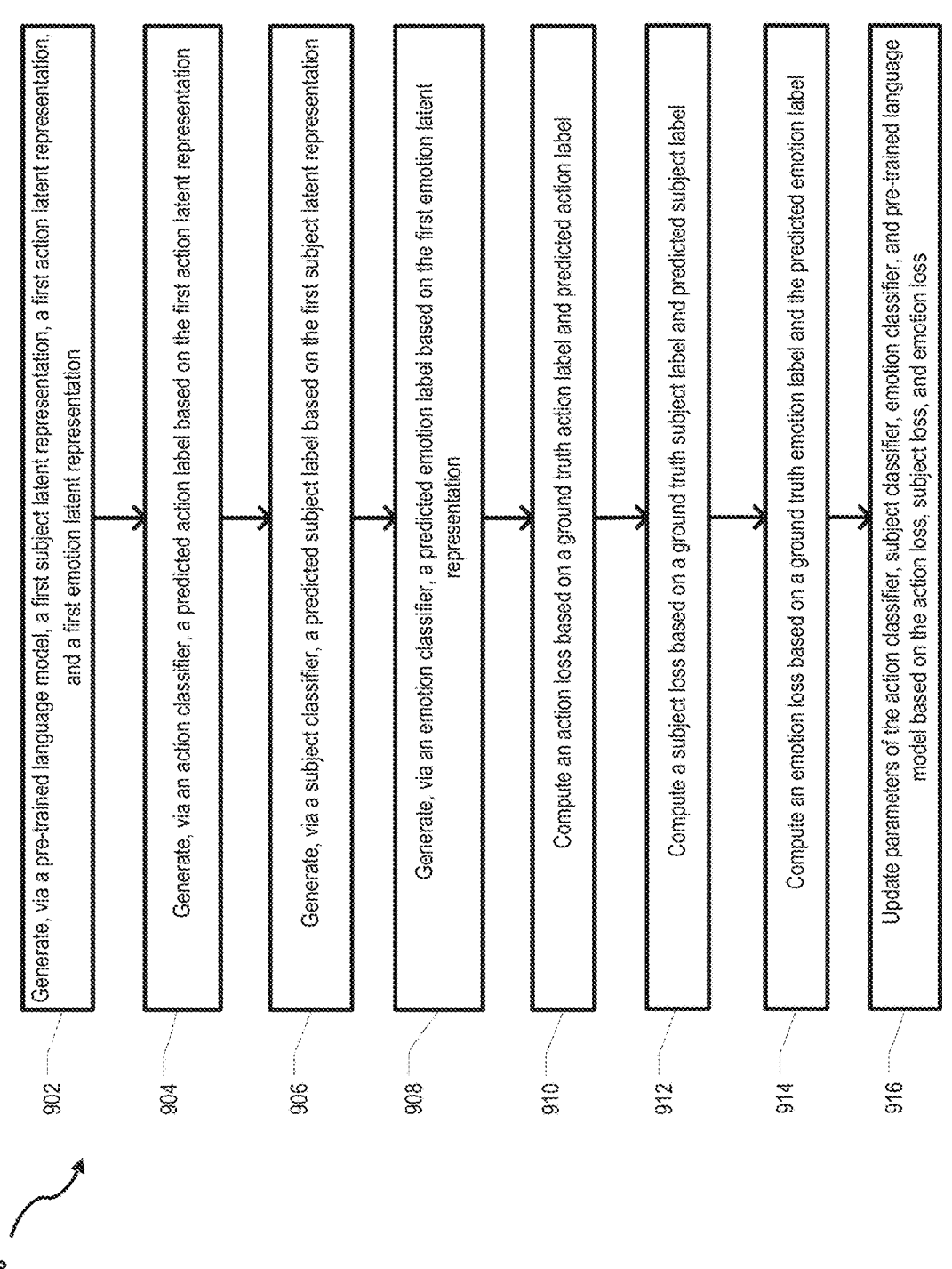

902 Generate, via a pre-trained language model, a first subject latent representation, a first action latent representation, and a first emotion latent representation 904 Generate, via an action classifier, a predicted action label based on the first action latent representation 906 Generate, via a subject classifier, a predicted subject label based on the first subject latent representation 908 Generate, via an emotion classifier, a predicted emotion label based on the first emotion latent representation 910 Compute an action loss based on a ground truth action label and predicted action label 912 Compute a subject loss based on a ground truth subject label and predicted subject label 914 Compute an emotion loss based on a ground truth emotion label and the predicted emotion label 916 Update parameters of the action classifier, subject classifier, emotion classifier, and pre-trained language model based on the action loss, subject loss, and emotion loss

| label | | | | Accuracy(%) ↑ | | |
|---|---|---|---|---|---|---|
| Sub. | Act. | Emo. | | Sub. | Act. | Emo. |
| ✗ | ✓ | ✗ | | - | 46.12 | - |
| ✓ | ✓ | ✗ | | 49.22 | 48.8 | - |
| ✗ | ✓ | ✓ | | - | 50.00 | 81.01 |
| ✓ | ✓ | ✓ | | 47.29 | 50.77 | 81.78 |

FIG. 11

| Models | $MMD_{avg}\downarrow$ | $MMD_{seq}\downarrow$ | $Acc(\%)\uparrow$ |
|---|---|---|---|
| Two-stage GAN | 1.310 | 1.233 | 8.30 |
| Time GAN | 1.172 | 1.188 | 41.67 |
| Proposed | 0.223 | 0.230 | 77.80 |
| GT | 0 | 0 | 100.00 |

FIG. 12

| Models | $MMD_{avg} \downarrow$ | $MMD_{seq} \downarrow$ | $Acc(\%) \uparrow$ |
|---|---|---|---|
| Two-stage GAN | 0.590 | 1.258 | 7.6 |
| Time GAN | 0.910 | 0.880 | 18.2 |
| Proposed | 0.311 | 0.294 | 22.1 |
| GT | 0 | 0 | 82.5 |

FIG. 13

SYSTEMS AND METHODS FOR GESTURE GENERATION FROM TEXT

CROSS REFERENCE(S)

The instant application is a nonprovisional of and claim priority under 35 U.S.C. 119 to U.S. provisional application No. 63/457,551, filed Apr. 6, 2023, which is hereby expressly incorporated by reference herein in its entirety.

TECHNICAL FIELD

The embodiments relate generally to systems and methods for gesture generation from text.

BACKGROUND

To interact effectively with humans, human-like agents, including virtual avatars and social robots, need to act not only with appropriate speech but also appropriate gestures. Importantly, the gestures should be relevant to the speech—an agent should not shake its head left to right while saying "Hello." While pre-trained language models and speech synthesis have emerged as powerful instruments for text and speech generation, gesture generation is not as developed. Current methods for gesture generation are constrained to a fixed length of generated frames, resulting in unnatural gestures. Also, current methods of gesture generation produce neutral gestures and are incapable of producing common, specific gestures, e.g., wave, handshake, and nod. Therefore, there is a need for improved systems and methods for gesture generation from text.

BRIEF DESCRIPTION OF THE DRAWINGS

FIG. 7 is an example logic flow diagram for gesture generation, according to some embodiments.

FIG. 8 is an example logic flow diagram for training gesture generation, according to some embodiments.

FIG. 9 is an example logic flow diagram for training gesture action classification, according to some embodiments.

FIGS. 11-13 provide charts illustrating exemplary performance of different embodiments described herein.

DETAILED DESCRIPTION

To interact effectively with humans, human-like agents, including virtual avatars and social robots, need to act not only with appropriate speech but also appropriate gestures.

Importantly, the gestures should be relevant to the speech—an agent should not shake its head left to right while saying "Hello." While pre-trained language models and speech synthesis have emerged as powerful instruments for text and speech generation, gesture generation is not as developed. Current methods for gesture generation are constrained to a fixed length of generated frames, resulting in unnatural gestures. Also, current methods of gesture generation produce neutral gestures and are incapable of producing common, specific gestures, e.g., wave, handshake, and nod.

Embodiments described herein relate generally to gesture generation from text using deep learning-based models and training for those models. Specifically, a model for gesture action classification and a model for gesture generation. For gesture action classification, systems and methods described herein may predict expressions from the sentences using a text classification model based on a pre-trained language model. For gesture generation, systems and methods described herein may utilize a gate recurrent unit-based autoregressive model. In some embodiments, during training, a loss defined on the embedding space helps to restore raw motions and generate intermediate motions.

In some embodiments, data augmentation and stop tokens are used to generate variable length motions. In addition to data augmentation, a dataset consisting of 12 gesture categories labeled in 1200 sample video clips is constructed.

Embodiments described herein provide a number of benefits. For example, methods described herein generate perceptually natural and realistic 3D human motion from text. In addition, methods described herein can generate gestures/motions of varying length.

Figure 1:
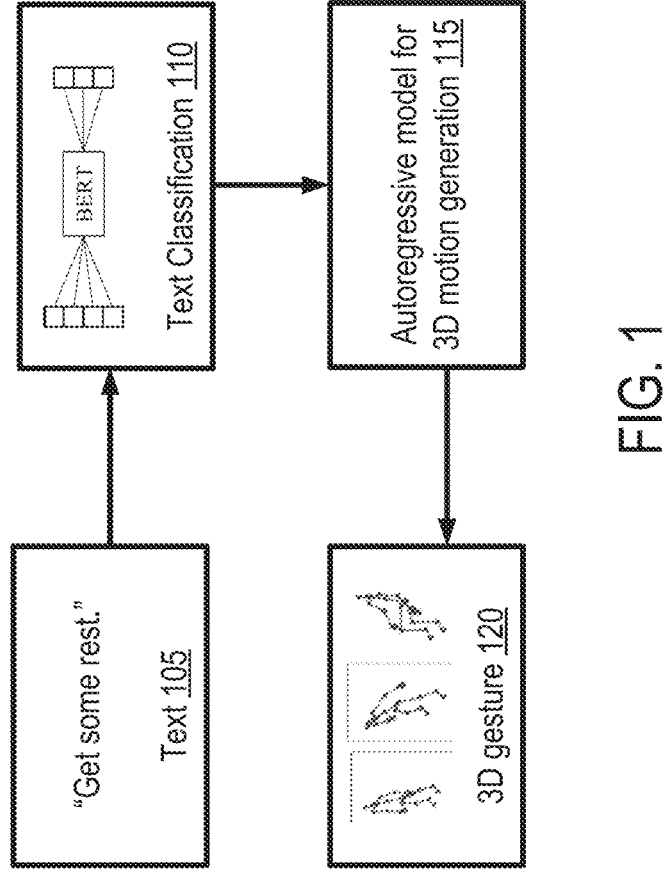
FIG. 1 illustrates an example of gesture generation from text, according to some embodiments.

FIG. 1 illustrates an example of gesture generation from text, according to some embodiments. As described herein, gesture generation may include a number of steps. First, text 105 is received. Then, text classification 110 is used to extract relevant features from the text 105. Finally, an autoregressive model 115 is used to generate a 3D gesture 120.

Text 105 may be provided by a user or provided by another computing system. For example, in a virtual world, a computer-generated avatar may generate text for display that is further used to generate gestures for the avatar. In some embodiments, text 105 is generated by a large language model (LLM).

Text classification 110 makes use of natural language processing models to extract relevant features from the text. Many models for natural language processing have been pre-trained to understand the relationships between words in a large vocabulary; for example, the Bidirectional Encoder Representations from Transformers (BERT) as described in Jacob Devlin et al. "BERT: Pre-training of Deep Bidirectional Transformers for Language Understanding," arXiv: 1810.04805. Using pre-trained language models, such as BERT, action features associated with the text may be extracted (e.g., in the form of a latent vector representation).

With the features extracted using text classification, and other tools, an autoregressive model 115 can be used to generate a 3D gesture 120 from the features. In some embodiments, the 3D gesture may be generated recursively, in a frame-by-frame manner, with each frame depending, at least in part, on a previously generated frame. Recognizing that not all gestures are as long or intricate as others, the number of frames varies depending on the input text. By generating a stop token, the systems and methods described herein are able to generate 3D gestures of varying length. For example, in some embodiments, a stop token may take values between 0 and 1. When the stop token associated with a frame is less than 0.5, then another frame will be generated; whereas when the stop token is greater than 0.5, then no more frames will be generated. Once the stop condition has been reached, the sequence of frames representing the 3D gesture can be displayed in a virtual environment to a user or by a user. In some embodiments, frames may be displayed as they are generated without waiting for the stop condition.

Figure 2:
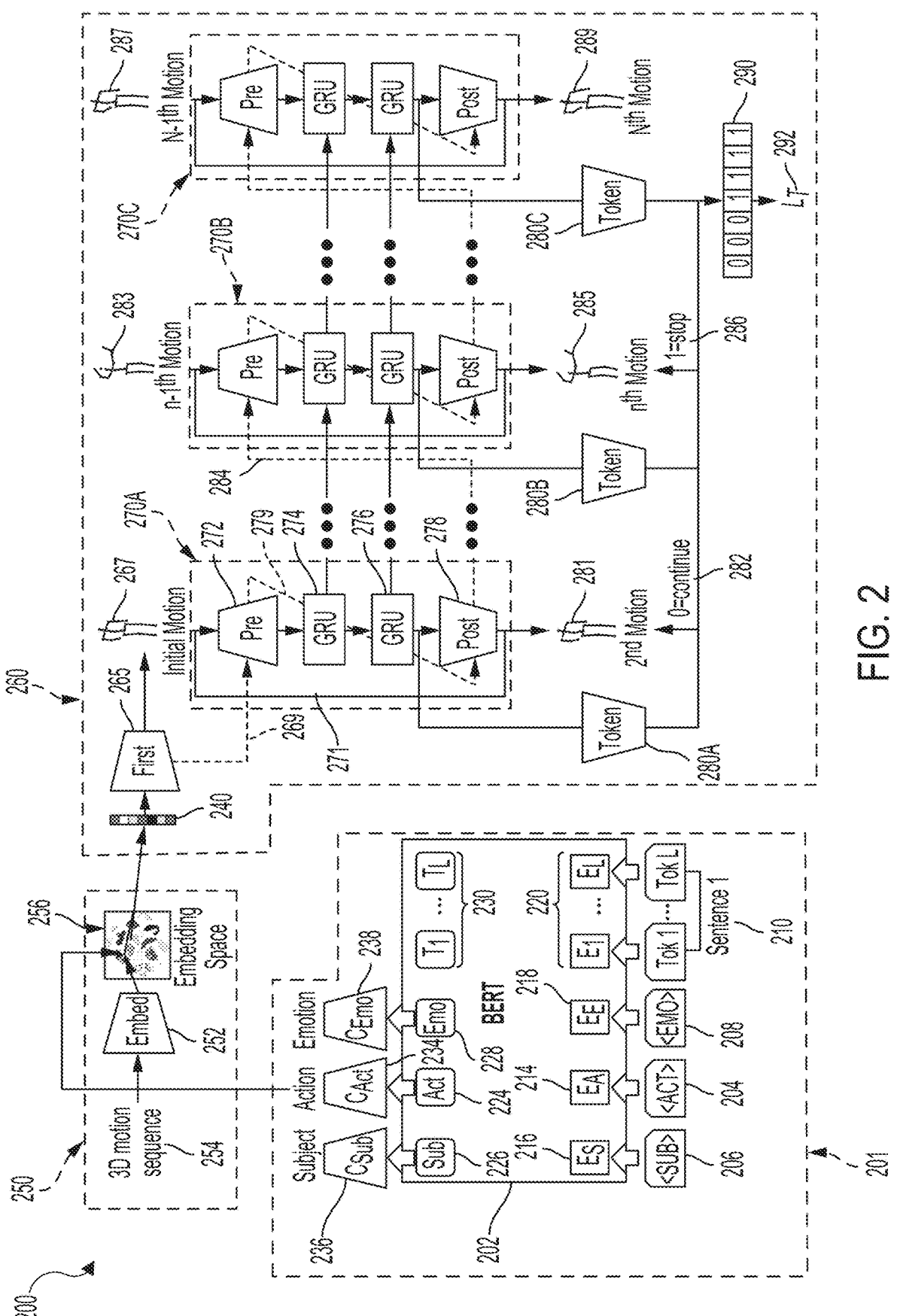
FIG. 2 illustrates a framework for gesture generation from text, according to some embodiments.

FIG. 2 illustrates an exemplary framework 200 for gesture generation from text, according to some embodiments. Framework 200 illustrates a deep learning-based model for 3D motion generation from the text. In some embodiments, component systems of the framework 200 may be trained independently. For example, framework 200 includes a gesture action classification system 201, motion sequence embedding system 250, and motion generation system 260, each of which is trained while the parameters of the other systems are held fixed. At inference, to generate a gesture, at least part of the gesture action classification system 201 and the motion generation system 260 may be used. Framework 200 includes a first encoder 202, second encoder 234, third encoder 236, fourth encoder 238, motion sequence embedder 252, first motion decoder 265, second motion decoders 270A-C, and token decoders 280A-C. The gesture action classification system 201 may include the first encoder 202, second encoder 234, third encoder, 236, and/or fourth encoder 238. The motion sequence embedding system 250 may include the motion sequence embedder 252. The motion generation system 260 may include the first motion decoder 265, second motion decoders 270A-C, and token decoders 280A-C.

Framework 200 begins with an action token 204, subject token 206, emotion token 208, and text tokens 210. The action token 204, subject token 206, and emotion token 208 may be initialized at a default value/token which will be transformed by the first encoder 202. Text tokens 210 may include one or more tokens associated with words in a sentence or phrase, i.e., "Sentence 1" as depicted in FIG. 2. For example, the sentence may be "Get some rest." as depicted in text 105 in FIG. 1. In some embodiments, one or more of tokens 204, 206, 208, 210 may be processed from an input text, such text input by a user or as generated by a computer for a virtual environment. Tokens 204, 206, 208, 210 are received by the first encoder 202.

In some embodiments, first encoder 202 may be a pre-trained language model (PLM), e.g., BERT, ALBERT, GPT-3, GPT-3.5, and GPT-4. Other PLMs beyond those listed may be used for first encoder 202, as well as PLMs developed after the filing of this disclosure. In some embodiments, a first encoder 202 may be pre-trained on transcription-label pairs, where the first encoder 202 updated to predict labels matching ground truth labels in the transcription-label pairs from an associated transcription. First encoder 202 may include an embedder that embeds the tokens 204, 206, 208, 210 into a respective vector representation for each token. For example, as depicted in FIG. 2, the embedder embeds action token 204 into action embedding 214, subject token 206 into subject embedding 216, emotion token 208 into emotion embedding 218, and text tokens 210 into text embeddings 220. From the embeddings, encoder 202 encodes latent representations in a latent representation space. For example, as depicted in FIG. 2, first encoder 202 encodes action embedding 214 into an action latent representation 224, subject embedding 216 into subject latent representation 226, emotion embedding 218 into 208 into emotion latent representation 228, and text embeddings 220 into text latent representations 230. The action latent representation 224, subject latent representation 226, and emotion latent representation 228 are received at second encoder 234, third encoder 236, and fourth encoder 238, respectively. In some embodiments, the action latent representation 224, subject latent representation 226, emotion latent representation 228, and/or text latent representations 230 may be in a one, larger, representation space. Each latent representation 224, 226, 228, and 230 may be generated based on all of the input embeddings (i.e., embeddings 214, 216, 218, and 220). For example, embeddings 214, 216, 218, and 220 may be concatenated into a vector, and the encoding of latent representations 224, 226, 228, and 230 may be generated using a self-attention mechanism across that concatenated vector such that the latent representations are encoded dependent on not only their respective associated embedding but also the context of the other embeddings.

The second encoder 234, third encoder 236, and fourth encoder 238 may be classification models. Second encoder 234 may be an action classification model $C_{act}$ that generates an action label from the action latent representation 224. The action label may be in a second representation space. As depicted in FIG. 2, the second representation space may also be referred to as an action embedding space 256. Third encoder 236 may be a subject classification model $C_{sub}$ that generates a subject label (not shown in FIG. 2) from the subject latent representation 226. The subject label may be in a third representation space. Fourth encoder 238 may be an emotion classification model $C_{emo}$ that generates an emotion label (not shown in FIG. 2) from the emotion latent representation 228. The emotion label may be in a fourth representation space.

In some embodiments, each classification model $C_{act}$, $C_{sub}$, and $C_{emo}$ may be neural networks comprising two fully connected layers with hidden layer size equal to 256 with ReLU activation and a dropout, p=0.3. At inference, only the action classification model 234 may be used. However, correct classification of subject and emotion improve the accuracy of the action/gesture classification. Thus, when training the gesture action classification model 201, all three classification models 234, 236, 238 may be used.

Training of the gesture action classification model 201 may use a cross-entropy loss. For example, let x be an input sentence 210, then the classification losses associated with $C_{act}$ 234, $C_{sub}$ 236, and $C_{emo}$ 238 for the input sentence 210 may be given by the following, respectively:

$$\mathcal{L}_{sub} = \mathcal{L}_{CE}(C_{sub}(BERT(x)), s) \qquad (1)$$

$$\mathcal{L}_{act} = \mathcal{L}_{CE}(C_{act}(BERT(x)), a) \qquad (2)$$

$$\mathcal{L}_{emo} = \mathcal{L}_{CE}(C_{emo}(BERT(x)), e) \qquad (3)$$

$$\mathcal{L} = \mathcal{L}_{sub} + \mathcal{L}_{act} + \mathcal{L}_{emo} \qquad (4)$$

where s, a, and e are subject, action, and emotion ground truth labels. In some embodiments, Adam optimizer is used for model training, where mini-batch size is 32, the epoch is 100, and the learning rate is 1e−5, though other optimizers may be used. Adam optimizer may be used in combination with backpropagation to update the parameters of the neural networks described herein. Adam optimizer is described in Diederik P. Kingma and Jimmy Ba, Adam: A method for stochastic optimization, arXiv preprint arXiv: 1412.6980, 2014.

Framework 200 further includes a motion sequence embedding system 250. The motion sequence embedding system 250 includes a motion sequence embedder 252. The motion sequence embedder 252 receives 3D motion sequence data 254. 3D motion sequence data 254 may take any number of forms, including a sequence of frames. Each frame of a sequence of frames may include a configuration of a body model. Motion sequence embedder 252 embeds 3D motion sequence data 254 into action embedding space 256. In some embodiments, the motion sequence embedder 252 may be a neural network comprising a Batch Normalization (BN) layer, a ReLU activation and a Convolution layer, which may be repeated five times with the convolution layer parameters of channel, kernel, and stride as follows: (64, 7, 2), (128, 3, 2), (256, 3, 2), (512, 3, 1), (1024, 3, 1). After applying global average pooling, the output is flattened to a 1024 dimensional vector 240 spanning the action embedding space 256.

The motion sequence embedder 252 may be trained using deep metric learning in supervised learning to estimate latent space that can classify action classes. Further details of deep metric learning are described in Florian Schroff, Dmitry Kalenichenko, and James Philbin, Facenet: A unified embedding for face recognition and clustering, in Proceedings of the I10 conference on computer vision and pattern recognition, 2015, pp. 815-823. The motion sequence embedder 252 may be trained by a triplet loss. For example, let f be 3D motion sequence data 254, then the triplet loss given by:

$$\mathcal{L}_E = \left[ \mathcal{L}_1 \big( E(f)_{anc}, E(f)_{pos} \big) - \mathcal{L}_1 \big( E(f)_{anc}, E(f)_{pos} \big) + 0.05 \right]_+ \qquad (5)$$

where anc, pos, and neg denote anchor, positive, and negative samples, respectively. The triplet is sampled by all possible triplets in a mini-batch. In some embodiments, the mini-batch includes N data samples, and one sample includes a motion sequence and its action label. A triplet is 3 samples which are selected in the mini-batch to calculate one triplet loss. The number of triplets are N choose 3 in the mini-batch. While Eq. 5 uses the L1 loss, other losses, e.g., L2, may be used.

Framework 200 includes a motion generation system 260. Motion generation system 260 includes a first motion decoder 265, second motion decoders 270A-C, and token decoders 280A-C. Second motion decoders 270A-C recursively generate successive motion frames until the token decoders 280A-C output a stop token meeting a threshold for terminating motion generation.

First motion decoder 265 receives a vector 240 in the action embedding space 256 and generates an initial motion 267. At inference, the vector 240 may be the output of the second encoder 234, whereas during training, vector 240 is generated by the motion sequence embedder from the 3D motion sequence 254 (during training the 3D motion sequence 254 serves as the ground truth gesture that motion generation system 260 is being trained to reproduce). In some embodiments, the vector 240 is a 1024-dimensional vector spanning the action embedding space 256. The initial motion 267 may represent the first of a plurality of frames which together comprise a generated gesture. The form of the data in initial motion 267 may take any numbers of forms, including the coordinates and/or rotational information associated with a configuration of a body model.

In some embodiments, the first motion decoder 265 may be a neural network comprising 4 fully-connected (FC) layers with LeakyReLU activation with a hidden size of 512. The output of the second FC layer of the first motion decoder 265 may become, by connection 269, an initial hidden state of Gated Recurrent Unit (GRU) in the pre-net 272 in second motion decoder 270A, described below.

After the initial motion 267 is generated, it is received by a second motion decoder 270A. Second motion decoder 270A generates a second motion 281 from the initial motion 167. The second motion decoder 270A may include a pre-net 272, GRU 274, GRU 276, and post-net 278. The pre-net and post-net may have the same structure, each consisting of 2 FC layers with LeakyReLU activation, one GRU layer, and 2 FC layers with LeakyReLU activation. Moreover, a residual connection 279 is applied between the pre-net and post-net to prevent any unnaturally sudden change of motion. The residual connection 279 shares the GRU hidden state of the pre-net 272 and the post-net 278 to enhance information transfer and long-term dependency of the model. In some embodiments, connection 279 provides the output of the pre-net's GRU as the input for the post-net's GRU. In some embodiments, the output hidden state of the post-net's GRU is provided, by connection 284, as the hidden state of the pre-net's GRU at the next motion generation iteration. The size of every hidden layer in the pre-net and post-net may be 512. The two GRUs 274, 276 layers may have hidden size 1024. GRU's may be a neural network providing a gating mechanism/unit to remember or forget certain states of neural network layers in recurrent processes. In some embodiments, GRUs referred to herein may be fully-gated. In some embodiments, a hidden state of a GRU in a previous iteration is used as the input hidden state of the GRU in the next iteration (e.g., the solid horizontal arrows with ellipses beginning at GRUs 274, 276).

In some embodiments, each of the motion decoders 270A-C include a skip connection 271 (also called a residual connection) from the input to the output of the decoder. In some embodiments, the initial motion 267 may be added to the output of the post-net 278 to generate the second motion 281. Skip connections help preserve information of the previous frames in long gesture sequences.

The output of the second GRU 276 may be received by token decoder 280A. Token decoder generates a stop token 282. In some embodiments, a stop token 282 may take values between 0 and 1. When the stop token associated with a frame (e.g., stop token 282 associated with second motion 281) is less than 0.5, then another frame will be generated; whereas when the stop token is greater than 0.5, then no more frames will be generated. Once the stop condition has been reached, the sequence of frames representing the 3D gesture can be displayed in a virtual environment to a user or by a user. Alternatively, the frames may be generated in real time and displayed.

In some embodiments, the token decoder 280A (also referred to as a token net) consists of 3 FC layers with hidden size 512 and LeakyReLU activation. The output of token decoder 280A may be a scalar and processed with a sigmoid function, resulting in stop token 282.

In some embodiments, motion generation system 260 generates the motion and token to maximum frame length N in the training phase. At inference, the model may generate the motion frames and tokens until the output of the token net satisfies a threshold for stopping motion generation. For example, when the rounded token is 1, then motion generation may stop, and if the rounded token is never one, then motion generation will stop at the Nth frame. In some embodiments, during training, the nth-to-Nth frames, while generated, are not used to compute a loss for updating parameters. Thus, the model can generate variable frame length data by the stop token. For example, as depicted in FIG. 2, the n-th motion 285 is decoded from the (n−1)-th motion 283 by second motion decoder 270B, and token decoder 280B generates a stop token value of 1, indicating that the gesture is complete. As depicted in FIG. 2, the N-th motion 289 is generated by second motion decoder 270C from the (N−1)th motion 287. N-th motion 289 is the last frame that the motion generation system 260 will generate during training. A token array 290 tracks when the stop token in the array indicated at what generated motion the gesture was complete, i.e., when the first entry of 1 appears in the array 290. The token array 290 may be used to determine a token loss 292 for training. As depicted in FIG. 2, in some embodiments, motion decoders 270A-C may all be the same decoder but operated recursively to generate a next motion frame from a previous motion frame.

In addition, a padding strategy may be employed on the training data, i.e., on 3D motion sequences. For example, last motion frame's joint coordinates from a 3D motion sequence may be copied identically to the remaining frames, i.e., up to frame N, essentially freezing the joints on the rest of the frames. To ensure that the generator is trained to stop generating the motion after a gesture is completed, a stop token of 0 is used for the first to the last of the motion frames and a stop token of 1 for the identically copied motion frames. The padded motion sequence associated stop tokens serve as the ground truth data for training. Furthermore, data augmentation may be used to increase the size of the dataset. In some embodiments, the data augmentation method is to randomly select some of the motion frames and remove them from the raw data to generate one augmented motion clip. The process may be repeated ten times over the same clip to generate ten slightly different augmented clips. Other numbers of frames may be removed to generate a new clip, e.g., 2, 3, 4, or any other positive integer. In some instances, removal may not be random but based on other metrics.

Training the motion generation system 260 may use a number of losses. In some embodiments, the L1 loss is used to train the first motion decoder 265, F, second motion decoder 270A-C G, and token decoder T with a 3D motion sequence and token. Since teacher-forcing is not applied to train the model, generating a good initial frame (e.g., 267) is important to generate the whole motion. Therefore, in some embodiments, more weight is added to first motion loss $L_F$ to generate better initial frames. Let v be an embedding vector 240 generated from a ground truth 3D motion sequence f 254 by the motion sequence embedded 252 and t be a ground truth token array as described above, then the reconstruction loss for the first frame ($L_F$) is calculated by:

$$\mathcal{L}_F = \mathcal{L}_1(G(v)[0], f[0]) \tag{6}$$

where the notation "[0]" indicates the first frame.

To prevent the framework generating still motion, the generator loss is not calculated for padded frames. The reconstruction loss for the remaining frames $L_G$ and token loss $L_T$ are calculated by:

$$\mathcal{L}_G = \sum_{n=0}^{L} \mathcal{L}_1(G(v)[n], f[n]) \tag{7}$$

$$\mathcal{L}_T = \sum_{n=1}^{N} \mathcal{L}_1(T(G(v))[n], t[n]) \tag{8}$$

where the notation "[n]" indicates the n-th frame, and where L is the frame length of the 3D motion sequence 354 f. After the token loss converges, the framework can estimate motion length by the token array. Moreover, to enhance the relationship between the embedding vector and fake motion, a fake embedding vector loss may be calculated by:

$$\mathcal{L}_E = \mathcal{L}_1(E(G(v)), v) \tag{9}$$

The final loss L may be calculated by:

$$\lambda \mathcal{L}_F + \mathcal{L}_G + \mathcal{L}_T \quad \text{if } \mathcal{L}_T > 0.01 \tag{9}$$

$$\lambda \mathcal{L}_F + \mathcal{L}_G + \mathcal{L}_E \quad \text{else}$$

where $\lambda$ is a hyperparameter is used to generate better initial frames as discussed above. For example, $\lambda$ may be set to 1.1, 2, or any other real number greater than 1. Alternatively, factors smaller than one may be includes in front of the other loss functions.

In some embodiments, Adam optimizer is used for model training, where mini-batch size is 32, the epoch is 500, and the learning rate is 1e−4.

Figure 3:
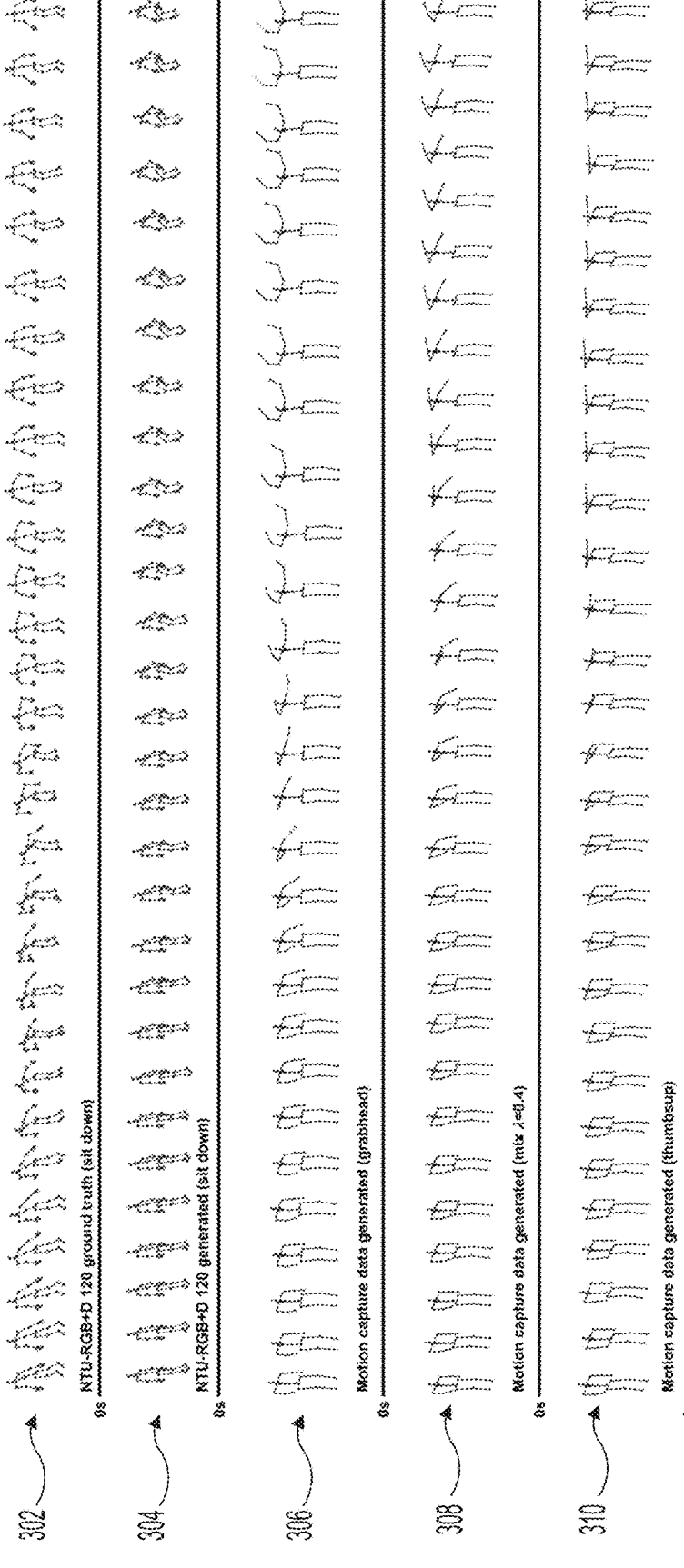
FIG. 3 are examples of generated gestures using a framework for gesture generation, according to some embodiments.

FIG. 3 are examples of generated gestures using a framework for gesture generation, according to some embodiments. Gestures are comprised by a number of frames that, when combined with a chosen frame rate, produce motion for a length of time. As shown in FIG. 3, the frames of a ground truth motion 302 and generated motions 304, 306, 308, 310 are displayed along a time axis. Each motion is shown taking one second.

A ground truth "sit down" motion 302 from the NTU-RGB+D 120 dataset, described below, is displayed. In this example, "sit down" is the action label. Starting from the left (i.e., the first frame) stick-and-joint model of a human body begins in a standing position. As time elapses, each frame shows the body moving into a sitting position—the knees are bent. A generated "sit down" motion 304 using the framework as described herein, shows the transition from standing to sitting, where the first frame shows a more realistic standing position and the final frame a more realistic sitting position compared to the ground truth 302.

A generated "grab head" motion 306 using the framework described herein and trained on a motion capture dataset, described below, is displayed. In this example, "grab head" is the action label, and the embedding vector (e.g., 240) is the mean vector of the test set with "grab head" action label. Starting from the left (i.e., the first frame) stick-and-joint model of a human body begins in a standing position. As time elapses, each frame shows the body raising its arms upwards towards the location of the head.

A generated "thumbs up" motion 310 using the framework described herein and trained on a motion capture dataset, described below, is displayed. In this example, "thumbs up" is the action label, and the embedding vector (e.g., 240) is the mean vector of the test set with "thumbs up" action label. Starting from the left (i.e., the first frame) stick-and-joint model of a human body begins in a standing position. As time elapses, each frame shows the body raising one of its arms upwards as you would expect from a person doing a thumbs up gesture.

A generated mixture of "thumbs up"+ "grab head" motion 308 using the framework described herein and trained on a motion capture dataset, described below, is displayed. In this example, the embedding vector (e.g., 240) is an intermediate vector that is the weighted sum vector between the mean vector for "grab head" and the mean vector for "thumb sup" action labels. The generated result using the intermediate embedding vector successfully mixes the motions of the two different labels. Starting from the left (i.e., the first frame) stick-and-joint model of a human body begins in a standing position. As time elapses, each frame shows the body raising one of its arms upwards as if grab its head while another arm moves into a position to give a thumbs up.

Figure 4:
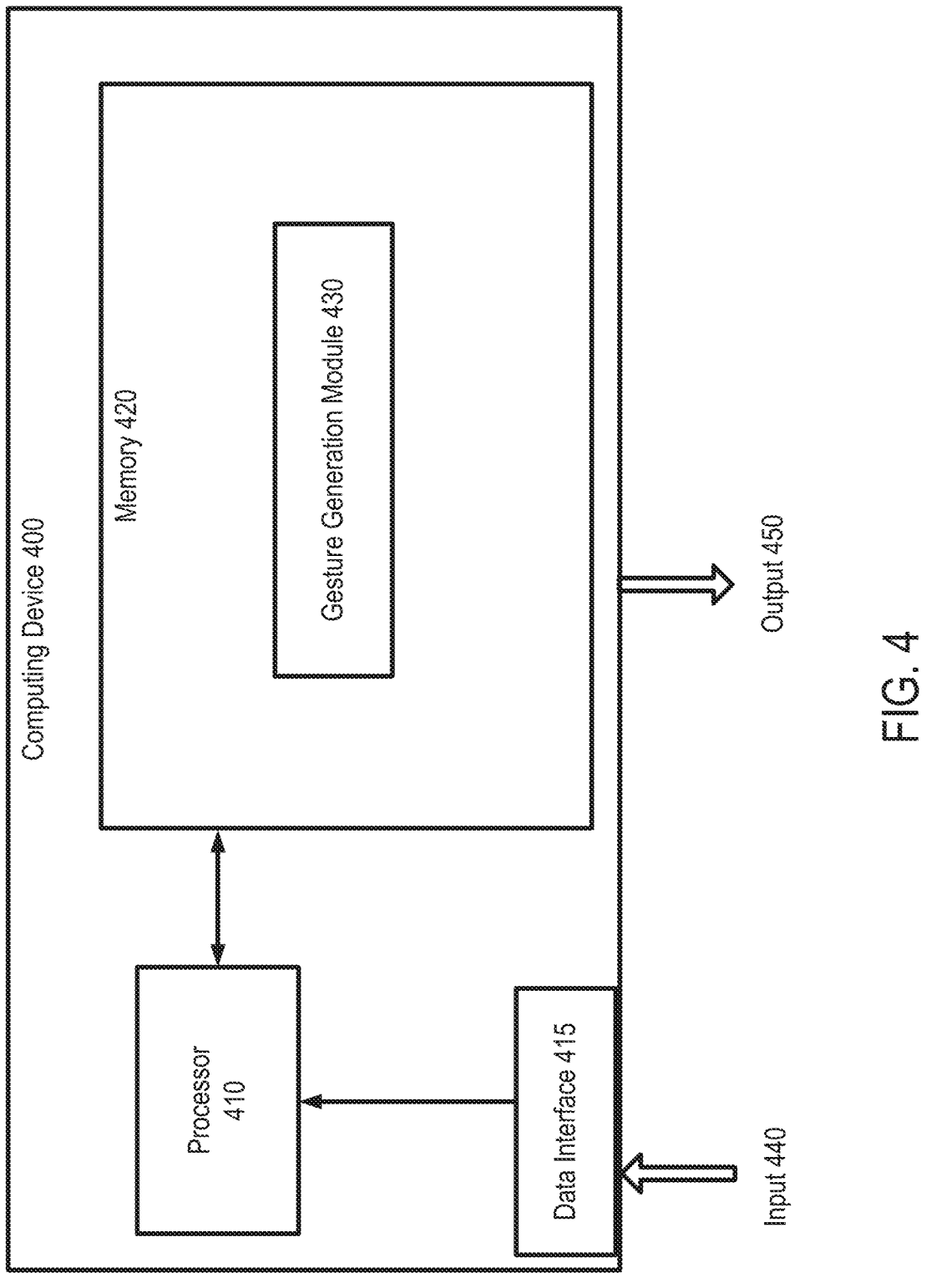
FIG. 4 is a simplified diagram illustrating a computing device implementing the framework described herein, according to some embodiments.

FIG. 4 is a simplified diagram illustrating a computing device 400 implementing the framework described herein, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of transitory or nontransitory machine-readable media (e.g., computer-readable media). Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for Gesture Generation module 430 that may be used to implement and/or emulate the systems and models, and/or to implement any of the methods described further herein.

Gesture Generation module 430 may receive input 440 such as a sentence, ground truth motion sequences, model parameters, images, text, etc. and generate an output 450 such as motion frames corresponding to an input text. For example, Gesture Generation module 430 may be configured to receive a textual sentence and generate an appropriate gesture or movement based on the action or expression associated with the textual sentence.

The data interface 415 may comprise a communication interface, a user interface (such as a voice input interface, a graphical user interface, and/or the like). For example, the computing device 400 may receive the input 440 from a networked device via a communication interface. Or the computing device 400 may receive the input 440, such as a sentence or phrase, from a user via the user interface.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
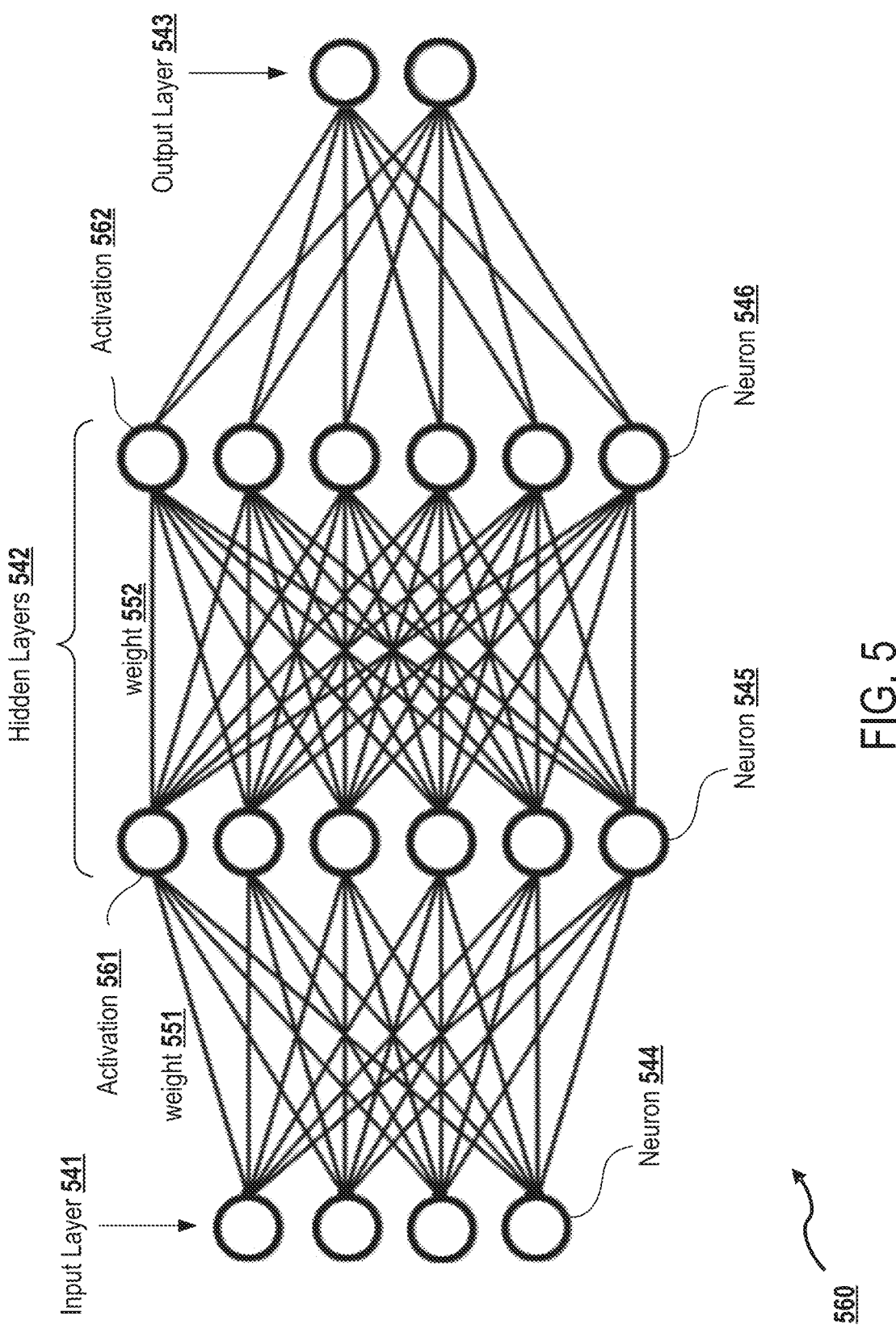
FIG. 5 is a simplified diagram illustrating a neural network structure, according to some embodiments.

FIG. 5 is a simplified diagram illustrating the neural network structure, according to some embodiments. In some embodiments, the Gesture Generation module 430 may be implemented at least partially via an artificial neural network structure shown in FIG. 5. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data such as training data, user input data, vectors representing latent features, etc. The number of nodes (neurons) in the input layer 541 may be determined by the dimensionality of the input data (e.g., the length of a vector of the input). Each node in the input layer represents a feature or attribute of the input.

The hidden layers 542 are intermediate layers between the input and output layers of a neural network. It is noted that two hidden layers 542 are shown in FIG. 5 for illustrative purpose only, and any number of hidden layers may be utilized in a neural network structure. Hidden layers 542 may extract and transform the input data through a series of weighted computations and activation functions.

For example, as discussed in FIG. 4, the Gesture Generation module 430 receives an input 440 and transforms the input into an output 450. To perform the transformation, a neural network such as the one illustrated in FIG. 5 may be utilized to perform, at least in part, the transformation. Each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the Gesture Generation module 430 may comprise the transformative neural network structure of layers of neurons, and weights and activation functions describing the non-linear transformation at each neuron. Such a neural network structure is often implemented on one or more hardware processors 410, such as a graphics processing unit (GPU).

In one embodiment, the Gesture Generation module 430 may be implemented by hardware, software and/or a combination thereof. For example, the Gesture Generation module 430 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based Gesture Generation module 430 may be trained by iteratively updating the underlying parameters (e.g., weights 551, 552, etc., bias parameters and/or coefficients in the activation functions 561, 562 associated with neurons) of the neural network based on a loss function. For example, during forward propagation, the training data such as 3D motion sequences or training text are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding action label or 3D motion sequence) from the training data, to compute a loss function that measures the discrepancy between the predicted output and the expected output. Given a loss function, the negative gradient of the loss function is computed with respect to each weight of each layer individually. Such negative gradient is computed one layer at a time, iteratively backward from the last layer

543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as a sentence or phrase including an action or expression not directly seen during training.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

The neural network illustrated in FIG. 5 is exemplary. For example, different neural network structures may be utilized, and additional neural-network based or non-neural-network based component may be used in conjunction as part of module 430. For example, a text input may first be embedded by an embedding model, a self-attention layer, etc. into a feature vector. The feature vector may be used as the input to input layer 541. Output from output layer 543 may be output directly to a user or may undergo further processing. For example, the output from output layer 543 may be decoded by a neural network based decoder. The neural network illustrated in FIG. 500 and described herein is representative and demonstrates a physical implementation for performing the methods described herein.

Through the training process, the neural network is "updated" into a trained neural network with updated parameters such as weights and biases. The trained neural network may be used in inference to perform the tasks described herein, for example those performed by module 430. The trained neural network thus improves neural network technology in gesture generation from text.

Figure 6:
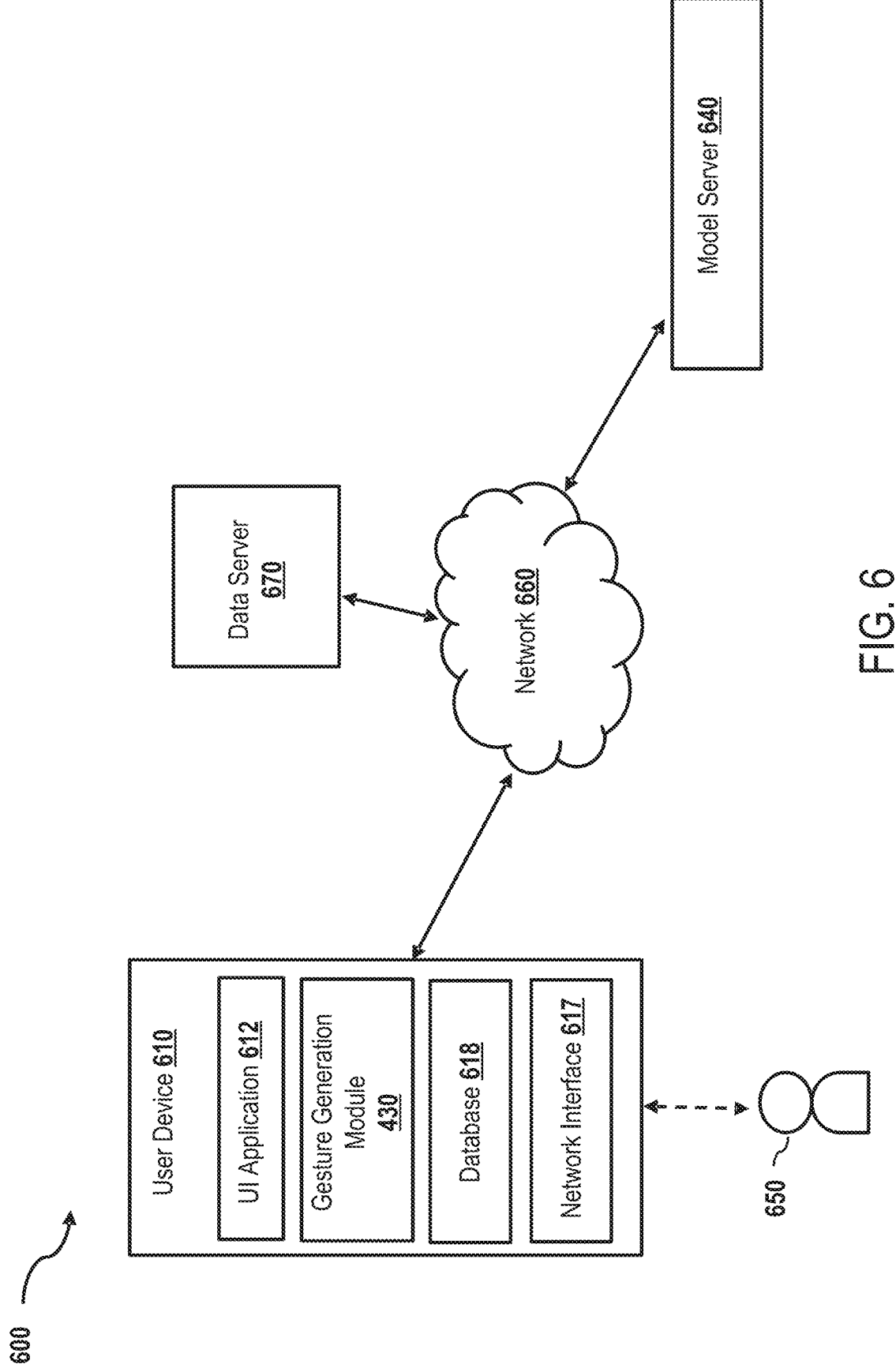
FIG. 6 is a simplified block diagram of a networked system suitable for implementing the framework described herein.

FIG. 6 is a simplified block diagram of a networked system 600 suitable for implementing the framework described herein. In one embodiment, system 600 includes the user device 610 (e.g., computing device 400) which may be operated by user 650, data server 670, model server 640, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, a real-time operation system (RTOS), or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities. In some embodiments, user device 610 is used in training neural network based models. In some embodiments, user device 610 is used in performing inference tasks using pre-trained neural network based models (locally or on a model server such as model server 640).

User device 610, data server 670, and model server 640 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660. User device 610, data server 670, and/or model server 640 may be a computing device 400 (or similar) as described herein.

In some embodiments, all or a subset of the actions described herein may be performed solely by user device 610. In some embodiments, all or a subset of the actions described herein may be performed in a distributed fashion by various network devices, for example as described herein.

User device 610 may be implemented as a communication device that may utilize appropriate hardware and software configured for wired and/or wireless communication with data server 670 and/or the model server 640. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and Gesture Generation module 430, which may correspond to executable processes, procedures, and/or applications with associated hardware. For example, the user device 610 may allow a user to provide a phrase or sentence. In other embodiments, user device 610 may include additional or different modules having specialized hardware and/or software as required.

In various embodiments, user device 610 includes other applications as may be desired in particular embodiments to provide features to user device 610. For example, other applications may include security applications for implementing client-side security features, programmatic client applications for interfacing with appropriate application programming interfaces (APIs) over network 660, or other types of applications. Other applications may also include communication applications, such as email, texting, voice, social networking, and IM applications that allow a user to send and receive emails, calls, texts, and other notifications through network 660.

Network 660 may be a network which is internal to an organization, such that information may be contained within secure boundaries. In some embodiments, network 660 may be a wide area network such as the internet. In some embodiments, network 660 may be comprised of direct physical connections between the devices. In some embodiments, network 660 may represent communication between different portions of a single device (e.g., a communication bus on a motherboard of a computation device).

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

User device 610 may further include database 618 stored in a transitory and/or non-transitory memory of user device 610, which may store various applications and data (e.g., model parameters) and be utilized during execution of various modules of user device 610. Database 618 may store previously generated gestures, etc. In some embodiments, database 618 may be local to user device 610. However, in other embodiments, database 618 may be external to user device 610 and accessible by user device 610, including cloud storage systems and/or databases that are accessible over network 660 (e.g., on data server 670).

User device 610 may include at least one network interface component 617 adapted to communicate with data server 670 and/or model server 640. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data Server 670 may perform some of the functions described herein. For example, data server 670 may store a training dataset including text and associated ground truth actions labels or 3D motion sequences, etc. Data server 670 may provide data to user device 610 and/or model server 640. For example, training data may be stored on data server 670 and that training data may be retrieved by model server 640 while training a model stored on model server 640.

Model server 640 may be a server that hosts models described herein. Model server 640 may provide an interface via network 660 such that user device 610 may perform functions relating to the models as described herein (e.g., displaying generated gestures). Model server 640 may communicate outputs of the models to user device 610 via network 660. User device 610 may display model outputs, or information based on model outputs, via a user interface to user 650.

FIG. 7 is an example logic flow diagram for gesture generation, according to some embodiments described herein. One or more of the processes of method 700 may be implemented, at least in part, in the form of executable code stored on non-transitory, tangible, machine-readable media that when run by one or more processors may cause the one or more processors to perform one or more of the processes (e.g., computing device 400). In some embodiments, method 700 corresponds to, at least a portion of, the operation of the Gesture Generation module 430 that performs gesture generation.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, a system (e.g., computing device 400, user device 610, model server 640, device 1000, or device 1015) receives, via a data interface (e.g., data interface 415, network interface 617), an input text (e.g., text tokens 210).

At step 704, the system generates, via an encoder (e.g., second encoder 234), an action representation (e.g., vector 240) in an action representation space based on the input text (e.g., text tokens 210). In some embodiments, the system first generates, via a language model (e.g., first encoder 202), an intermediate representation (e.g., latent representations 224, 226, 228, 230) in an intermediate representation space based on the input text, wherein the intermediate representation includes a first action representation (e.g., 224).

At step 706, the system generates, via a first motion decoder (e.g., 265), a first body configuration (e.g., initial motion 267) based on the action representation (e.g., vector 240).

At step 708, the system generates, via a second motion decoder (e.g., 270A), a second body configuration (e.g., second motion 281) based on the first body configuration (e.g., initial motion 267). In some embodiments, the second motion decoder includes a first neural network, a second neural network, and a third neural network (e.g., pre-net 272, GRU 274, and post-net 278, respectively). In some embodiments, a hidden state of the first motion decoder is shared (e.g., by connection 269) with the first neural network. In some embodiments, the second motion decoder includes a residual connection (e.g., residual connection 279) between the first neural network and third neural network.

At step 710, the system generates, via a token decoder (e.g., token decoder 280A), a first stop token (e.g., stop token 282) based on the first body configuration (e.g., initial motion 267), wherein the first stop token determines whether a third body configuration (e.g., n-th motion 285, where n is 3) will be decoded by the second motion decoder (e.g., second motion decoder 270B).

In some embodiments, the first stop token meets a threshold and the system generates, via the second motion decoder, a third body configuration (e.g., n-th motion 285, where n is 3) based on the second body configuration, and generates via the token decoder (e.g., token decoder 280B), a second stop token (e.g., stop token 286) based on the second body configuration.

FIG. 8 is an example logic flow diagram for training gesture generation 260, according to some embodiments described herein. One or more of the processes of method 800 may be implemented, at least in part, in the form of executable code stored on non-transitory, tangible, machine-readable media that when run by one or more processors may cause the one or more processors to perform one or more of the processes (e.g., computing device 400). In some embodiments, method 800 corresponds to, at least a portion of, the operation of the Gesture Generation module 430 that performs gesture generation.

As illustrated, the method 800 includes a number of enumerated steps, but aspects of the method 800 may include additional steps before, after, and in between the enumerated steps. In some aspects, one or more of the enumerated steps may be omitted or performed in a different order.

At step 802, a system (e.g., computing device 400, user device 610, model server 640, device 1000, or device 1015) generates, via a pre-trained motion sequence embedder (e.g., motion sequence embedded 252), an embedding vector (e.g., vector 240) based on a ground truth motion sequence (e.g., 3D motion sequence 254).

At step 804, the system generates, via the first motion decoder (e.g., 265), a first predicted body configuration (e.g., first motion 267) based on the embedding vector.

At step 806, the system generates, via the second motion decoder (e.g., 270A), a second predicted body configuration (e.g., second motion 281) based on the first predicted body configuration. In some embodiments, the second motion decoder includes a first neural network, a second neural network, and a third neural network (e.g., pre-net 272, GRU 274, and post-net 278, respectively). In some embodiments, a hidden state of the first motion decoder is shared (e.g., by connection 269) with the first neural network. In some embodiments, the second motion decoder includes a residual connection (e.g., residual connection 279) between the first neural network and third neural network.

At step 808, the system generates, via the token decoder (e.g., token decoder 280A), a first predicted stop token (e.g., stop token 282) based on the first predicted body configuration At step 810, the system computes a first loss (e.g., $L_F$ as described herein) based on the ground truth motion sequence and the first predicted body configuration.

At step 812, the system computes a second loss (e.g., $L_G$ based on the ground truth motion sequence and the second predicted body configuration.

At step 814, the system computes a third loss (e.g., $L_F$ as described herein) based on the first predicted stop token and a ground truth token. For example, the ground truth token may correspond to whether or not a particular frame in the ground truth motion sequence is a padding frame, i.e., one added to the original motion sequence, or a frame a part of the unpadded motion sequence. In the former case, the stop token should indicate the motion is complete, whereas the latter case indicates addition frames/motions should be generated.

At step 816, the system update parameters of the first motion decoder, second motion decoder, and token decoder based on the first loss, second loss, and third loss. In some embodiments, the first loss receives a weighting factor (e.g., $\lambda$ as shown in Eq. 3) greater than 1.

In some embodiments, the system generates, via the pre-trained motion sequence embedder, a predicted body configuration (e.g., $E(G(v))$) embedding based on the first predicted body configuration and the second predicted body configuration. In some embodiments, the system computes a fourth loss (as described in Eq. 9) based on the embedding vector and the predicted body configuration embedding. In some embodiments, the system updates the parameters further based on the fourth loss.

In some embodiments, the first predicted stop token meets a threshold, and the system generates, via the second motion decoder, a third predicted body configuration (e.g., n-th motion 285, where n is 3) based on the second predicted body configuration, and generates via the token decoder (e.g., token decoder 280B), a second stop token (e.g., stop token 286) based on the second predicted body configuration.

FIG. 9 is an example logic flow diagram for training gesture action classification 201, according to some embodiments described herein. One or more of the processes of method 900 may be implemented, at least in part, in the form of executable code stored on non-transitory, tangible, machine-readable media that when run by one or more processors may cause the one or more processors to perform one or more of the processes (e.g., computing device 400). In some embodiments, method 900 corresponds to, at least a portion of, the operation of the Gesture Generation module 430 that performs gesture generation.

As illustrated, the method 900 includes a number of enumerated steps, but aspects of the method 900 may include additional steps before, after, and in between the enumerated steps. In some aspects, one or more of the enumerated steps may be omitted or performed in a different order.

At step 902, a system (e.g., computing device 400, user device 610, model server 640, device 1000, or device 1015) generates, via a pre-trained language model (e.g., first encoder 202), a first subject latent representation (e.g., subject latent representation 226), a first action latent representation (e.g., action latent representation 224), and a first emotion latent representation (e.g., emotion latent representation 228).

At step 904, the system generates, via an action classifier (e.g., second encoder 234), a predicted action label based on the first action latent representation.

At step 906, the system generates, via a subject classifier (e.g., third encoder 236), a predicted subject label based on the first subject latent representation.

At step 908, the system generates, via an emotion classifier (e.g., fourth encoder 238), a predicted emotion label based on the first emotion latent representation.

At step 910, the system computes an action loss (e.g., as described in Eq. 2) based on a ground truth action label (e.g., a as described herein) and predicted action label.

At step 912, the system computes a subject loss (e.g., as described in Eq. 1) based on a ground truth subject label (e.g., s as described herein) and predicted subject label.

At step 914, the system computes an emotion loss (e.g., as described in Eq. 3) based on a ground truth emotion label (e.g., e as described herein) and the predicted emotion label.

At step 916, the system updates parameters of the action classifier, subject classifier, emotion classifier, and pre-trained language model based on the action loss, subject loss, and emotion loss.

Figure 10B:
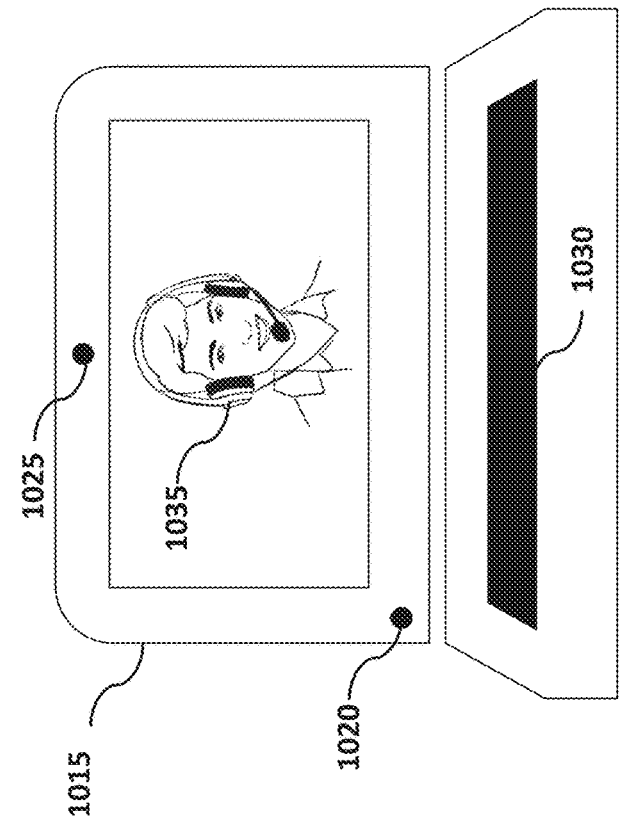
FIGS. 10A-10B are exemplary devices with digital avatar interfaces, according to some embodiments.
Figure 10A:
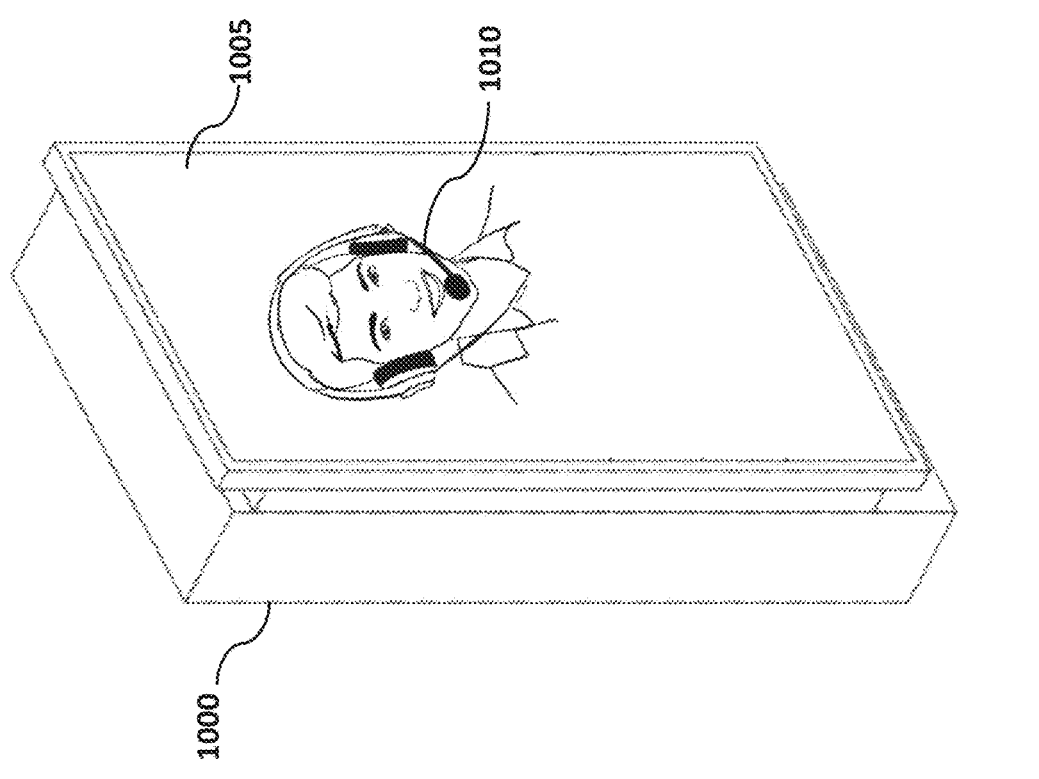

FIG. 10A is an exemplary device 1000 with a digital avatar interface, according to some embodiments. Device 1000 may be, for example, a kiosk that is available for use at a store, a library, a transit station, etc. Device 1000 may display a digital avatar 1010 on display 1005. In some embodiments, a user may interact with the digital avatar 1010 as they would a person, using voice and non-verbal gestures. Digital avatar 1010 may interact with a user via digitally synthesized gestures, digitally synthesized voice, etc. Gesture synthesis may be performed as described in FIGS. 1-9.

Device 1000 may include one or more microphones, and one or more image-capture devices (not shown) for user interaction. Device 1000 may be connected to a network (e.g., network 660). Digital Avatar 1010 may be controlled via local software and/or through software that is at a central server accessed via a network. For example, an AI model may be used to control the behavior of digital avatar 1010, and that AI model may be run remotely. In some embodiments, device 1000 may be configured to perform functions described herein (e.g., via digital avatar 1010). For example, device 1000 may perform one or more of the functions as described with reference to computing device 400 or user device 610. For example, generating gestures from text.

FIG. 10B is an exemplary device 1015 with a digital avatar interface, according to some embodiments. Device 1015 may be, for example, a personal laptop computer or other computing device. Device 1015 may have an application that displays a digital avatar 1035 with functionality similar to device 1000. For example, device 1015 may include a microphone 1020 and image capturing device 1025, which may be used to interact with digital avatar 1035. In addition, device 1015 may have other input devices such as a keyboard 1030 for entering text.

Digital avatar 1035 may interact with a user via digitally synthesized gestures, digitally synthesized voice, etc. Gesture synthesis may be performed as described in FIGS. 1-9]. In some embodiments, device 1015 may be configured to perform functions described herein (e.g., via digital avatar 1035). For example, device 1015 may perform one or more of the functions as described with reference to computing device 400 or user device 610. For example, generating gestures from text.

FIGS. 11-13 provide charts illustrating exemplary performance of different embodiments described herein. Baseline models utilized in the experiments include Two-stage GAN as described in Cai et al., Deep video generation, prediction and completion of human action sequences, in Proceedings of the European conference on computer vision (ECCV), 2018, pp. 366-382; and TimeGAN as described in Yoon et al., Time-series generative adversarial networks, Advances in Neural Information Processing Systems, vol. 32, 2019. Metrics used in the charts include Maximum Mean Discrepancy ($MMD_{avg}$ and $MMD_{seg}$) as described in Yu et al., Structure-aware human-action generation, in European Conference on Computer Vision, Springer, 2020, pp. 18-34; and Recognition Accuracy as described in Song et al., Constructing stronger and faster baselines for skeleton-based action recognition, arXiv preprint arXiv: 2106.15125, 2021. Embodiments of the methods described herein are indicated in the charts as "Proposed". The NTU-RGB+D 120 dataset was utilized in the experiments as described in Liu et al., "Ntu rgb+d 120: A large-scale benchmark for 3d human activity understanding," in IEEE transactions on pattern analysis and machine intelligence, vol. 42, no. 10, pp. 2684-2701, 2019. From the NTU-RGB+D 120 dataset 12 classes are selected, which are sit down, clapping, cheer up, hand waving, jump up, head nod-ding, head shaking, kicking, finger-pointing, hugging, walking apart, and thumb up. The cross-subject setting is applied for the train/test data split.

A new multitask classification dataset for text-to-gesture was constructed. The dataset contains 1050 training samples and 259 test samples, which are collected from the transcription of YouTube conversation videos. Each video clip with speech is turned into a sentence with the subject, the gesture, and the emotion labeled. The subject label has 16 classes: greeting, gratitude, farewell, information, inquiry, apology, praise, anger, congratulation, sympathy, cheer, concern, request, surprise, complaint, neutral. The gesture label has 12 classes: handshake, point, thumbsup, nod, shakehead, wave, grabhead, pat, uplift, yay, shrug, neutral. The emotion label has 3 classes: positive, negative, neutral. Only the gesture label is applied in the model.

A new motion capture dataset was constructed which consists of a (gesture label, 3D joint trajectory) pair, using a motion capture device. In the dataset, 100 samples were collected for each gesture label, and a total of 1200 samples were collected. Each sample has 1 to 3 seconds long frames captured at 60 fps, each frame has 21 joints, and each joint has a 3D joint location. The dataset is separated to 95% as train set and 5% as test set.

FIG. 11 illustrates that the Proposed framework achieves the best action classification performance when estimating the subject, action, and emotion labels at once. Since the subject and emotion are not independent of the action in the sentence, the subject classification, and emotion classification help to improve action classification.

FIGS. 12 and 13 illustrate that the Proposed framework outperforms the comparison methods on $MMD_{avg}$, $MMD_{seq}$, and accuracy on motion capture and NTU-RGB+D 120 datasets. For Recognition Accuracy, the Proposed framework yields the highest accuracy, which shows the Proposed framework generates highly recognizable motions and captures the characteristics of the action types.

The devices described above may be implemented by one or more hardware components, software components, and/or a combination of the hardware components and the software components. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMS, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for gesture generation from text, the method comprising:

receiving, via a data interface, an input text;

generating, via an encoder, an action representation in an action representation space based on the input text;

generating, via a first motion decoder, a first body configuration based on the action representation;

generating, via a second motion decoder, a second body configuration based on the first body configuration; and generating, via a token decoder, a first stop token based on the first body configuration.

2. The method of claim 1, wherein generating the action representation includes first generating, via a language model, an intermediate representation in an intermediate representation space based on the input text, wherein the intermediate representation includes a first action representation.

3. The method of claim 1, wherein the second motion decoder includes a sequence of a first neural network, a second neural network, and a third neural network.

4. The method of claim 3, wherein a hidden state of the first motion decoder is shared with the first neural network.

5. The method of claim 3, wherein the second motion decoder includes a residual connection between the first neural network and third neural network.

6. The method of claim 1, wherein the first stop token meets a threshold and further comprising:

generating, via the second motion decoder, a third body configuration based on the second body configuration; and generating via the token decoder, a second stop token based on the second body configuration.

7. The method of claim 3, wherein generating the second body configuration further comprises combining the first body configuration with an output of the third neural network.

8. A system for gesture generation from text, the system comprising:

a memory that stores a plurality of processor-executable instructions;

a data interface that receives an input text; and one or more processors that read and execute the plurality of processor-executable instructions from the memory to perform operations comprising:

receiving, via a data interface, an input text;

generating, via an encoder, an action representation in an action representation space based on the input text;

generating, via a first motion decoder, a first body configuration based on the action representation;

generating, via a second motion decoder, a second body configuration based on the first body configuration; and generating, via a token decoder, a first stop token based on the first body configuration.

9. The system of claim 8, wherein operations for generating the action representation include first generating, via a language model, an intermediate representation in an intermediate representation space based on the input text, wherein the intermediate representation includes a first action representation.

10. The system of claim 8, wherein the second motion decoder includes a sequence of a first neural network, a second neural network, and a third neural network.

11. The system of claim 10, wherein a hidden state of the first motion decoder is shared with the first neural network.

12. The system of claim 10, wherein the second motion decoder includes a residual connection between the first neural network and third neural network.

13. The system of claim 8, wherein the first stop token meets a threshold and the operations further comprising:

generating, via the second motion decoder, a third body configuration based on the second body configuration; and generating via the token decoder, a second stop token based on the second body configuration.

\*  \*  \*  \*  \*